(12) United States Patent
Josiah et al.

(10) Patent No.: US 10,216,117 B2
(45) Date of Patent: Feb. 26, 2019

(54) TONER CARTRIDGE PRINTER SYSTEM AND DEVICE THAT OVER PRINTS AND UNDER PRINTS

(71) Applicant: UI Technologies, Inc., Las Vegas, NV (US)

(72) Inventors: Michael Raymond Josiah, North Patchogue, NY (US); Joseph Dovi, Lake Grove, NY (US)

(73) Assignee: UI Technologies, Inc., Las Vegas, NV (US)

( * ) Notice: Subject to any disclaimer, the term of this patent is extended or adjusted under 35 U.S.C. 154(b) by 0 days.

(21) Appl. No.: 15/993,551

(22) Filed: May 30, 2018

(65) Prior Publication Data

US 2018/0275559 A1    Sep. 27, 2018

Related U.S. Application Data

(63) Continuation-in-part of application No. 15/800,482, filed on Nov. 1, 2017, which is a continuation-in-part (Continued)

(51) Int. Cl.
G03G 15/00    (2006.01)
G03G 15/08    (2006.01)
(Continued)

(52) U.S. Cl.
CPC ............ *G03G 15/0865* (2013.01); *B41J 2/01* (2013.01); *G03G 15/0126* (2013.01); *G03G 15/0152* (2013.01); *G03G 15/6585* (2013.01); *H04N 1/508* (2013.01); *H04N 1/54* (2013.01); *G03G 15/0875* (2013.01)

(58) Field of Classification Search
CPC ........... G03G 15/6585; G03G 15/0152; G03G 9/0875
See application file for complete search history.

(56) References Cited

U.S. PATENT DOCUMENTS

| | | | |
|---|---|---|---|
| 2004/0218027 A1* | 11/2004 | Kenworthy | ............ B41J 2/2114 347/95 |
| 2005/0168554 A1* | 8/2005 | Tsao | ....................... B41J 2/2114 347/101 |
| 2013/0050322 A1* | 2/2013 | Vall | .......................... B41J 2/175 347/14 |

* cited by examiner

*Primary Examiner* — Walter L Lindsay, Jr.
*Assistant Examiner* — Jessica L Eley
(74) *Attorney, Agent, or Firm* — Hankin Patent Law, APC; Kevin Schraven; Anooj Patel

(57) ABSTRACT

A color toner printer system that is configured to both over print in a single pass and under print in a single pass, and that is configured to switch between over and under printing, the system comprising: a color toner printer comprising at least four toner printing cartridge slots, a front slot, a second slot, a third slot, and a rear slot, which are configured to matingly engage with at least four toner printing cartridges comprising three color toner printing cartridges and a non-standard toner printing cartridge; and a raster image processor software. The color toner printer is configured to over print when the non-standard toner printing cartridge is in said rear slot, and to under print when the non-standard toner printing cartridge is in said front slot. The RIP software is configured to (1) remap the color toner printer to reflect an actual placement of the at least four toner printing cartridges and (2) allows said color toner printer to under print in a single pass or over print in a single pass.

22 Claims, 10 Drawing Sheets

Related U.S. Application Data of application No. 15/408,186, filed on Jan. 17, 2017, now Pat. No. 9,835,968, said application No. 15/800,482 is a continuation-in-part of application No. 15/286,875, filed on Oct. 6, 2016, now Pat. No. 9,835,981, and a continuation-in-part of application No. 15/286,943, filed on Oct. 6, 2016, now Pat. No. 9,835,982, said application No. 15/800,482 is a continuation-in-part of application No. 15/286,998, filed on Oct. 6, 2016, now Pat. No. 9,835,983, and a continuation-in-part of application No. 14/879,548, filed on Oct. 9, 2015, now Pat. No. 9,488,932, said application No. 15/800,482 is a continuation-in-part of application No. 14/731,785, filed on Jun. 5, 2015, now Pat. No. 9,383,684, application No. 15/993,551, which is a continuation-in-part of application No. 15/722,562, filed on Oct. 2, 2017, and a continuation-in-part of application No. 15/722,503, filed on Oct. 2, 2017.

(60) Provisional application No. 62/470,639, filed on Mar. 13, 2017.

(51) Int. Cl.
*H04N 1/50* (2006.01)
*G03G 15/01* (2006.01)
*B41J 2/01* (2006.01)
*H04N 1/54* (2006.01)

TONER CARTRIDGE PRINTER SYSTEM AND DEVICE THAT OVER PRINTS AND UNDER PRINTS

CROSS-REFERENCE TO RELATED APPLICATIONS

This Patent Application is a Continuation-in-Part Application of U.S. Non-Provisional patent application Ser. No. 15/800,482, titled Method For Converting A Toner Cartridge Printer To A Sublimation Toner Printer, filed on Nov. 1, 2017, the contents of which are expressly incorporated herein by this reference as though set forth in their entirety and to which priority is claimed. U.S. Non-Provisional patent application Ser. No. 15/800,482 takes priority from U.S. Provisional Patent Application No. 62/470,639, filed on Mar. 13, 2017, titled Toner Cartridge Printer Devices, Systems, and Methods, the contents of which are expressly incorporated herein by this reference as though set forth in their entirety and to which priority is claimed. This Patent Application is a Continuation-in-Part Application of U.S. Non-Provisional patent application Ser. No. 15/722,562, titled Toner Cartridge Printer Devices, Systems, And Methods For Under Printing, filed on Oct. 2, 2017, the contents of which are expressly incorporated herein by this reference as though set forth in their entirety and to which priority is claimed. This Patent Application is a Continuation-in-Part Application of U.S. Non-Provisional patent application Ser. No. 15/722,503, titled Method And System For Converting A Toner Cartridge Printer To A Metallic Or Light Toner Printer, filed on Oct. 2, 2017, the contents of which are expressly incorporated herein by this reference as though set forth in their entirety and to which priority is claimed. U.S. Non-Provisional patent application Ser. No. 15/800,482, is a Continuation-in-Part of the following U.S. Non-Provisional Patent Application Nos., which means that this U.S. Patent Application is also a Continuation in Part of the following U.S. Non-Provisional Patent Application Nos.: (1) Ser. No. 15/408,186, filed on Jan. 17, 2017, titled, Toner Cartridge Printer Devices, Systems, and Methods For Over Printing and Under Printing, now U.S. Pat. No. 9,835,968; (2) Ser. No. 15/286,998, filed on Oct. 6, 2016, titled, Method and System for Converting a Toner Cartridge Printer to a Double White Toner Printer, now U.S. Pat. No. 9,835,983; (3) Ser. No. 15/286,943, filed on Oct. 6, 2016, titled Method And System For Converting A Toner Cartridge Printer To A White, Clear, Metallic, Fluorescent, Or Light Toner Printer, now U.S. Pat. No. 9,835,982; (4) Ser. No. 15/286,875, filed on Oct. 6, 2016, titled, Method and System for Converting a Toner Cartridge Printer to a Metallic, Clear Fluorescent, or Light Toner Printer, now U.S. Pat. No. 9,835,981; (5) Ser. No. 14/879,548, now U.S. Pat. No. 9,488,932, filed on Oct. 9, 2015, titled, Method and System for Converting a Toner Cartridge Printer to a White, Clear, or Fluorescent Toner Printer; (6) Ser. No. 14/731,785, now U.S. Pat. No. 9,383,684, filed on Jun. 5, 2015, titled, Method and System for Converting a Toner Cartridge Printer to a White Toner Printer; the contents of all of which are expressly incorporated herein by this reference as though set forth in their entirety and to which priority is claimed as Continuation in Part.

FIELD OF USE

The present disclosure relates generally to a toner cartridge printer that is able to both under print and over print, and more specifically, to devices, systems, and methods of providing a toner printer that can first over print (or under print) in a single pass, and then be converted into a printer that can then under print (or over print) in a single pass.

BACKGROUND

Before the present disclosure, toner printers were unable to over print and under print in a single pass. This is desirable because in order to accomplish both under printing and overprinting, a user would have to purchase two different machines or systems. Under printing is beneficial because it allows printing on a darker media without having the colors of the print job be washed out by the darker media. Over printing is beneficial because it allows for a heat transfer print operation to a darker media without having the colors of the print job be washed out by the darker media.

Furthermore, before the present disclosure, there existed toner printers that could under print in a single pass, and toner printers that could over print in a single pass, but there existed no machines that could over or under print in a single pass. Typically, the over print must be done after laying down the color print job, which is two passes. The under print must be done before laying down the color print job, which is also in two passes.

Thus, there is a need for device, system, and method for providing or converting a toner cartridge printer that can over print in a single pass and then under print in a single pass and then vice versa. Preferably, the device, system, and method allows for a single machine or system be capable to interchange from over printing to under printing and vice-versa.

SUMMARY OF EMBODIMENTS

To minimize the limitations in the cited references, and to minimize other limitations that will become apparent upon reading and understanding the present specification, the toner cartridge printer devices, systems, and methods disclosed herein preferably allow a user to over print in a single pass and then convert the printer to under print in a single pass, and vice-versa.

One embodiment may be a CMYX color toner printer system that is configured to both over print in a single pass and under print in a single pass and that is configured to switch between over and under printing, the system comprising: a color toner printer comprising four toner printing cartridge slots, a front slot, a second slot, a third slot, and a rear slot; four toner printing cartridges comprising three color toner printing cartridges and a non-standard toner printing cartridge that are configured to matingly engage with the four toner printing cartridge slots; and a raster image processor software; wherein the color toner printer is configured to over print when the non-standard toner printing cartridge is in the rear slot; wherein the color toner printer is configured to under print when the non-standard toner printing cartridge is in the front slot; wherein the raster image processor software is configured to (1) remap the color toner printer to reflect an actual placement of the four toner printing cartridges and (2) allows the color toner printer to under print in a single pass or over print in a single pass; wherein the color toner printer is configured to (1) over print in a single pass, (2) under print in a single pass, and (3) switch between being configured to over print and under print. The non-standard toner printing cartridge may be selected from the group of non-standard toner printing cartridges consisting of: white; clear; and clear fluorescent. The raster image processor software may further be configured to allow the color toner printer to spot print with the non-standard toner printing cartridge. The three color toner printer cartridges may comprise: a cyan toner printing cartridge, a magenta toner printing cartridge, and a yellow toner printing cartridge. The raster image processor software may further be configured to allow the color toner printer to print black by using, in combination, the cyan toner, the magenta toner, and the yellow toner. The non-standard toner printing cartridge comprises a chip that allows the color toner printer to recognize the non-standard toner printing cartridge. When the non-standard toner printing cartridge is in the rear slot, an image is printed beneath a layer of a non-standard toner in the non-standard toner printing cartridge in a single pass. When the non-standard toner printing cartridge is in the front slot, an image is printed above a layer of a non-standard toner in the non-standard toner printing cartridge in a single pass.

Another embodiment may be a CMYKX color toner printer system that is configured to both over print in a single pass and under print in a single pass and that is configured to switch between over and under printing, the system comprising: a color toner printer comprising five toner printing cartridge slots, a front slot, a second slot, a third slot, a fourth slot and a rear slot; four toner printing cartridges comprising three color toner printing cartridges, a black toner printing cartridge, and a non-standard toner printing cartridge that are configured to matingly engage with the four toner printing cartridge slots; and a raster image processor software; wherein the color toner printer is configured to over print when the non-standard toner printing cartridge is in the rear slot; wherein the color toner printer is configured to under print when the non-standard toner printing cartridge is in the front slot; wherein the raster image processor software is configured to (1) remap the color toner printer to reflect an actual placement of the four toner printing cartridges and (2) allows the color toner printer to under print in a single pass or over print in a single pass; wherein the color toner printer is configured to (1) over print in a single pass, (2) under print in a single pass, and (3) switch between being configured to over print and under print. The non-standard toner printing cartridge may be selected from the group of non-standard toner printing cartridges consisting of: white; clear; and clear fluorescent. The raster image processor software may be further configured to allow the color toner printer to spot print with the non-standard toner printing cartridge. The three color toner printer cartridges may comprise: a cyan toner printing cartridge, a magenta toner printing cartridge, and a yellow toner printing cartridge. The non-standard toner printing cartridge may comprise a chip that allows the color toner printer to recognize the non-standard toner printing cartridge. When the non-standard toner printing cartridge is in the rear slot, an image is printed beneath a layer of a non-standard toner in the non-standard toner printing cartridge in a single pass. When the non-standard toner printing cartridge is in the front slot, an image is printed above a layer of a non-standard toner in the non-standard toner printing cartridge in a single pass.

Another embodiment may be a color toner printer system that is configured to both over print in a single pass and under print in a single pass and that is configured to switch between over and under printing, the system comprising: a color toner printer comprising at least four toner printing cartridge slots, a front slot, a second slot, a third slot, and a rear slot, which are configured to matingly engage with at least four toner printing cartridges comprising three color toner printing cartridges and a non-standard toner printing cartridge; and a raster image processor software; wherein the color toner printer is configured to over print when the non-standard toner printing cartridge is in the rear slot; wherein the color toner printer is configured to under print when the non-standard toner printing cartridge is in the front slot; wherein the raster image processor software is configured to (1) remap the color toner printer to reflect an actual placement of the at least four toner printing cartridges and (2) allows the color toner printer to under print in a single pass or over print in a single pass; wherein the color toner printer is configured to (1) over print in a single pass, (2) under print in a single pass, and (3) switch between being configured to over print and under print. The non-standard toner printing cartridge may be selected from the group of non-standard toner printing cartridges consisting of: white; clear; and clear fluorescent. The raster image processor software may further be configured to allow the color toner printer to spot print with the non-standard toner printing cartridge. The three color toner printer cartridges may comprise: a cyan toner printing cartridge, a magenta toner printing cartridge, and a yellow toner printing cartridge. If the color printer only has four toner printing cartridge slots, the raster image processor software is further configured to allow the color toner printer to print black by using, in combination, the cyan toner, the magenta toner, and the yellow toner. When the non-standard toner printing cartridge is in the rear slot, an image is printed beneath a layer of a non-standard toner in the non-standard toner printing cartridge in a single pass. When the non-standard toner printing cartridge is in the front slot, an image is printed above a layer of a non-standard toner in the non-standard toner printing cartridge in a single pass.

One embodiment may be a method of converting a standard CMYK color toner printer to a CMYW toner printer, comprising the steps: providing a standard CMYK color toner printer, comprising four toner printing cartridges: a cyan toner printing cartridge, a magenta toner printing cartridge, a yellow toner printing cartridge, and a black toner printing cartridge; wherein the black toner printing cartridge is in a first toner printing cartridge position; removing the black toner printing cartridge from the standard CMYK color toner printer, such that the first toner printing cartridge position is empty; providing a white toner printing cartridge; installing the white toner printing cartridge into the first toner printing cartridge position, such that the standard CMYK color toner printer is now a CMYW toner printer; and wherein the standard CMYK color toner printer lacks a raster imaging processor software, such that the CMYW toner printer does not distinguish the white toner printing cartridge from the black toner printing cartridge, such that the CMYW toner printer prints white rather than black. The white toner printing cartridge may comprise a printing cartridge chip that allows the CMYK color toner printer to recognize the white toner printing cartridge as an acceptable toner printing cartridge when the white toner printing cartridge is installed into the CMYK color toner printer.

Another embodiment may be a method of converting a CMYK color toner printer to a CMYX color toner printer for under print printing in a single pass, comprising the steps: providing a color toner printer with four toner printing cartridges: a cyan toner printing cartridge, a magenta toner printing cartridge, a yellow toner printing cartridge, and a black toner printing cartridge; wherein the black toner printing cartridge is in a first toner cartridge position; removing the back toner printing cartridge from the first toner cartridge position; providing a non-standard toner printing cartridge; installing the non-standard toner printing cartridge into the first toner cartridge position; providing a raster image processor software; wherein the raster image processor software is configured to remap the four toner printing cartridges of the color toner printer and allows the color toner printer to print a layer of non-standard toner under an image in a single pass; and wherein the image is printed from at least one of a cyan toner, a yellow toner, and a magenta toner. The non-standard toner printing cartridge may comprise a chip that allows the non-standard toner printing cartridge to be recognized by the color toner printer. The non-standard toner printing cartridge may be selected from the group of non-standard toner printing cartridges consisting of: white; clear; and clear fluorescent. The raster image processor software may be further configured to allow the color toner printer to spot print with the non-standard toner printing cartridge. The raster image processor software may be further configured to allow the color toner printer to print black by using, in combination, the cyan toner, the magenta toner, and the yellow toner. The raster image processor software may comprise at least one feature selected from the group of features consisting of: removing one or more colors from the image to be printed; changing one or more colors of the image; reducing an amount of toner used to print the image; reducing an amount of non-standard toner used to print under the image; increasing the amount of toner used to print the image; increasing the amount of non-standard toner used to print under the image; rasterizing the image; and providing a cost calculation for printing the image. The method may further comprise the step: printing the image, such that the image may be printed above the layer of non-standard toner in a single pass. The method may further comprise the steps: removing the non-standard toner printing cartridge from the first toner cartridge position; removing the cyan toner printing cartridge from a fourth toner cartridge position; installing the cyan toner printing cartridge into the first toner cartridge position; installing the non-standard toner printing cartridge into the fourth toner cartridge position; remapping with the raster image processor software the four toner printing cartridges of the color toner printer, such that the color toner printer is configured to print a new layer of non-standard toner over a second image in a single pass; wherein the second image is printed from at least one of: a cyan toner, a yellow toner, and a magenta toner. The method may further comprise the step: printing the image, such that the image is printed beneath the layer of the non-standard toner in a single pass.

Another embodiment may be a method of converting a CMYK color toner printer to a CMYX color toner printer for over print printing in a single pass, comprising the steps: providing a color toner printer, comprising four toner printing cartridges: a cyan toner printing cartridge, a magenta toner printing cartridge, a yellow toner printing cartridge, and a black toner printing cartridge; removing the black toner printing cartridge from a first toner cartridge position; removing the cyan toner printing cartridge from a fourth toner cartridge position; providing a non-standard toner printing cartridge; installing the cyan toner printing cartridge into the first toner cartridge position; installing the non-standard toner printing cartridge into the fourth toner cartridge position; providing a raster image processor software; wherein the raster image processor software is configured to remap the four toner printing cartridges of the color toner printer and allows the color toner printer to print a layer of non-standard toner over an image in a single pass; wherein the image is printed from at least one of: a cyan toner, a yellow toner, and a magenta toner. The non-standard toner printing cartridge may comprise a chip that allows the color toner printer to recognize the non-standard toner printing cartridge. The non-standard toner printing cartridge may be selected from the group of non-standard toner printing cartridges consisting of: white; clear; and clear fluorescent. The raster image processor software may be further configured to allow the color toner printer to spot print with the non-standard toner printing cartridge. The raster image processor software may be further configured to allow the color toner printer to print black by using, in combination, the cyan toner, the magenta toner, and the yellow toner. The raster image processor software may be further configured to comprise at least one of the features selected from the group of features consisting of: removing one or more colors from the image to be printed; changing one or more colors in the image; reducing an amount of toner used to print the image; reducing an amount of non-standard toner used to print under the image; increasing the amount of toner used to print the image; increasing the amount of non-standard toner used to print over the image; rasterizing the image; and providing a cost calculation for printing the image. The method may further comprise the step: printing the second image, such that the second image is printed beneath the new layer of non-standard toner in a single pass. The method may further comprise the steps: removing the non-standard toner printing cartridge from the fourth toner cartridge position; removing the cyan toner printing cartridge from the first toner cartridge position; installing the non-standard toner printing cartridge into the first toner cartridge position; installing the cyan toner printing cartridge into the fourth toner cartridge position; remapping with the raster image processor software the four toner printing cartridges of the color toner printer, such that the color toner printer is configured to print a new layer of non-standard toner under a second image in a single pass; wherein the second image is printed from at least one of: a cyan toner, a yellow toner, and a magenta toner. The method may further comprise the step: printing the second image, such that the second image is printed above of the new layer of non-standard toner in a single pass.

Other features and advantages inherent in the system and method for converting a standard toner cartridge printer into white, metallic, fluorescent, or light toner printer claimed and disclosed will become apparent to those skilled in the art from the following detailed description and its accompanying drawings.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps, which are illustrated. When the same numeral appears in different drawings, it refers to the same or like components or steps.

DETAILED DESCRIPTION OF THE ILLUSTRATIVE EMBODIMENTS

Figure 1:
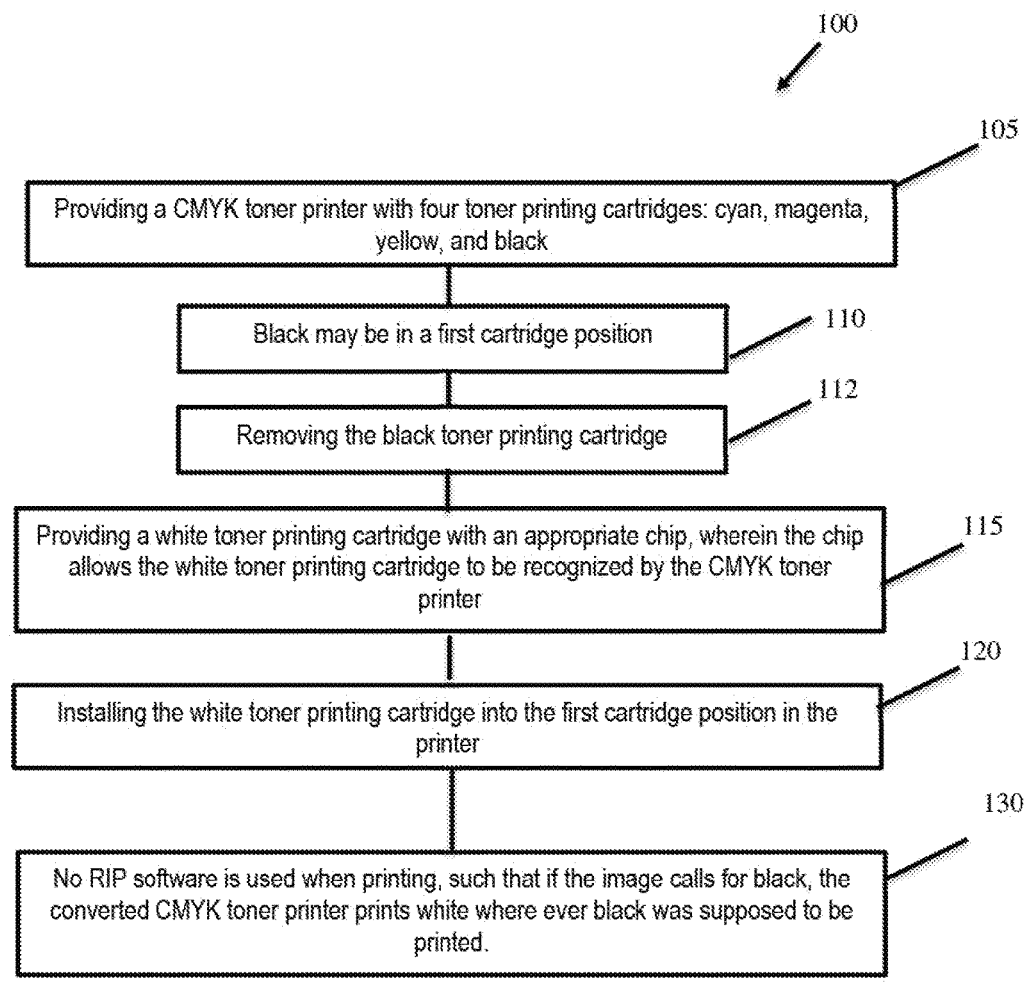
FIG. 1 is a flow block diagram of one embodiment of the method of converting a CMYK printer to a CMYW printer.

In the following detailed description, numerous specific details are set forth in order to provide a thorough understanding of various aspects of one or more embodiments. However, these embodiments may be practiced without some or all of these specific details. In other instances, well-known methods, procedures, and/or components have not been described in detail so as not to unnecessarily obscure aspects of embodiments.

While multiple embodiments are disclosed, still other embodiments will become apparent to those skilled in the art from the following detailed description. As will be realized, these embodiments are capable of modifications in various obvious aspects, all without departing from the spirit and scope of protection. Accordingly, the screen shots, figures, and the detailed descriptions thereof, are to be regarded as illustrative in nature and not restrictive. Also, the reference or non-reference to a particular embodiment shall not be interpreted to limit the scope of protection.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 15% of the indicated number or range of numbers. In one embodiment, the term "approximately" and "about", refer to a deviance of between 0.0001-40% from the indicated number or range of numbers.

In the following description, certain terminology is used to describe certain features of one or more embodiments. For purposes of the specification, unless otherwise specified, the term "printing cartridge(s)" generally refers to a toner cartridge, a laser toner cartridge, a LED toner cartridge, a drum cartridge, and/or a combined toner and drum cartridge.

As used herein, the term "toner" generally refers to a powder, particulate, or dry ink that is used in laser printers, printers, and printing machines to form the printed text and images on the medium being printed. Generally, toner particles are melted by the heat of a fuser, and bound to the media.

Regarding a CMYK printer, the letter "K" preferably stands for black.

Regarding a CMYKW printer, the letter "W" preferably stands for white, but may also refer to a non-standard toner or toner color, such as white, clear, clear fluorescent, and/or metallic.

Regarding a CMYKX printer, the letter "X" refers to a non-standard toner or toner color, such as white, metallic, fluorescent, light, clear, clear fluorescent, ceramic, and/or sublimation.

The term transfer material may typically refer to a polyurethane media that accepts the toner print job and then allows the print job to be transferred to a final print surface via heat transfer. The transfer material may also be constructed from any suitable material, such as a specially coated paper or even just plain paper. The final print surface is preferably plastic or polymer, such as, for example, a polyester shirt or product.

FIG. 1 is a flow block diagram of one embodiment of the method of converting a CMYK printer to a CMYW printer. As shown in FIG. 1, the first step of the method 100 may be providing a standard CMYK color toner printer, which may comprise four toner printing cartridges: cyan, magenta, yellow, and black 105. This method is generally applicable with printers that (1) have printing cartridges that are dual drums and toner cartridges or (2) have separate drum and toner cartridges for each color. If used with printers having separate cartridges, then both cartridges may be removed and/or replaced. Typically, the black toner printing cartridge may be in the first position 110, and may later be removed 112. The black toner printing cartridge may be (1) reserved for later swapping back into the printer, (2) refilled for later use, (3) recycled (if completely empty), and/or (4) cleaned and filled with a different color and then used. The next step 115 may be providing a white toner printing cartridge. This cartridge may comprise a cartridge chip that allows the printer to recognize the white toner printing cartridge as an acceptable cartridge after installed into the first cartridge position 120. Preferably, the printer recognizes the white toner printing cartridge as black. Thus, because no raster image processor software is used when printing, the now converted CMYK toner printer preferably prints white in areas where black is to be printed.

Figure 2:
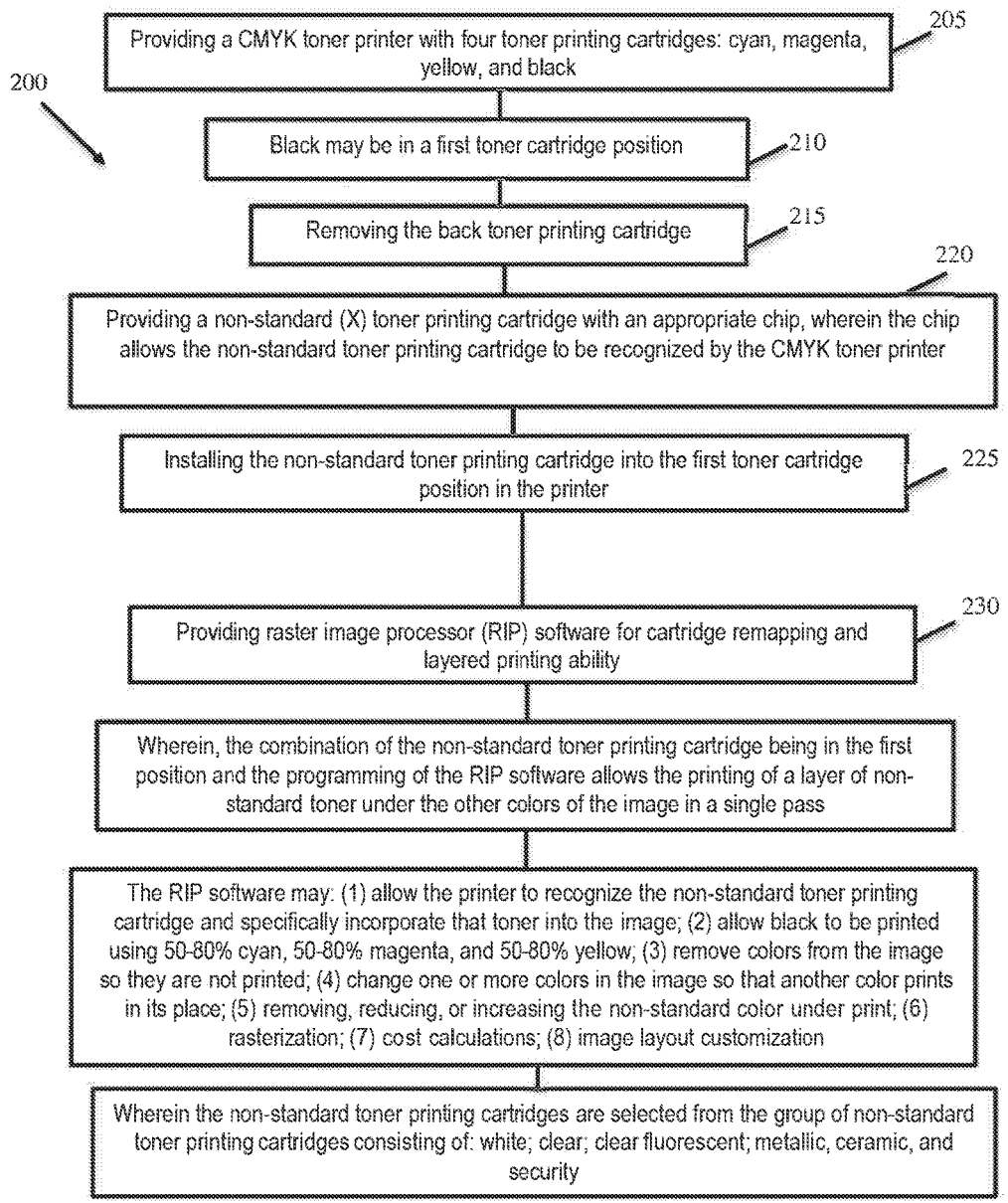
FIG. 2 is a flow block diagram of one embodiment of the method of converting a CMYK printer to a CMYX printer for under printing in one pass.

FIG. 2 is a flow block diagram of one embodiment of the method of converting a CMYK printer to a CMYX printer for under printing in one pass. The first step of method 200 may be providing a CMYK toner printer with four toner printing cartridges: cyan, magenta, yellow, and black 205, wherein black may be in a first toner cartridge position 210; removing the back toner printing cartridge 215; providing a non-standard (X) toner printing cartridge with an appropriate chip, wherein the chip allows the non-standard toner printing cartridge to be recognized by the CMYK toner printer 220; installing the non-standard toner printing cartridge into the first toner cartridge position in the printer 225;

and providing raster image processor (RIP) software for cartridge remapping and layered printing ability 230, wherein, the combination of the non-standard toner printing cartridge being in the first position and the programming of the RIP software may allow the user to print a layer of non-standard toner under the other colors of the image in a single pass 235. The RIP software may: (1) allow the printer to recognize the non-standard toner printing cartridge and may specifically incorporate that toner into the image; (2) allow black to be printed using a combination of cyan, magenta, and yellow (the amount of each may be set or determined by RIP; usually 50-80% of each color is used to create a rich black); (3) remove colors from the image so that the colors are not printed; (4) change one or more colors in the image so that another color prints in its place; (5) removing, reducing, or increasing the non-standard color under print; (6) rasterization; (7) cost calculations; (8) image layout customization 240. The non-standard toner printing cartridges may be selected from the group of non-standard toner printing cartridges consisting of: white; clear; clear fluorescent; metallic, ceramic, and security 240.

Figure 3:
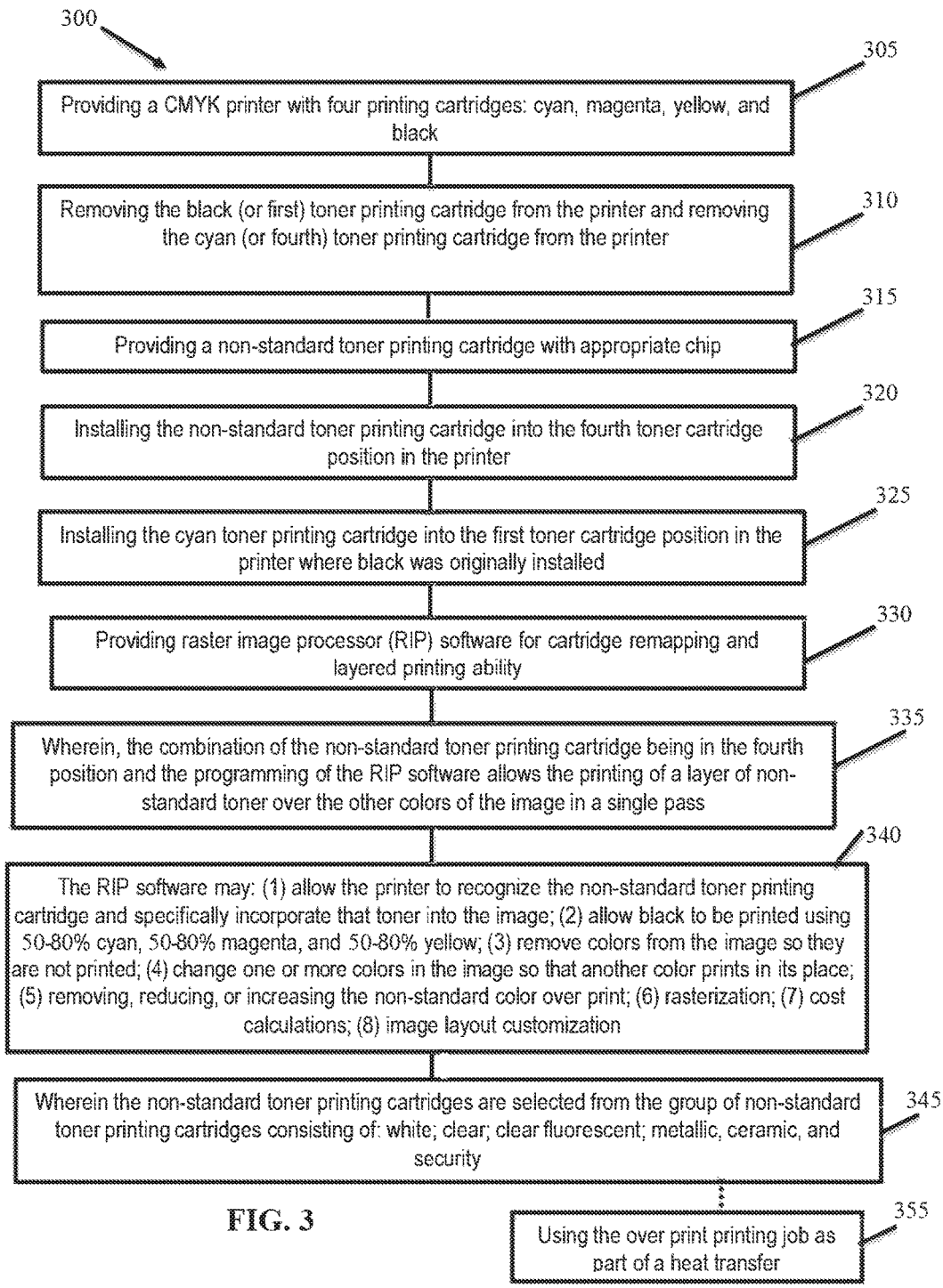
FIG. 3 is a flow block diagram of one embodiment of the method of converting a CMYK printer to a CMYX printer for over printing in one pass.

FIG. 3 is a flow block diagram of one embodiment of the method of converting a CMYK printer to a CMYX printer for over printing in a single pass. The method 300 may comprise the steps: providing a CMYK printer with four printing cartridges: cyan, magenta, yellow, and black 305; removing the black (or first) toner printing cartridge from the printer (the first toner cartridge position) and removing the cyan (or fourth) toner printing cartridge from the printer (the fourth toner cartridge position) 310; providing a non-standard toner printing cartridge with the appropriate chip 315; installing the non-standard toner printing cartridge into the fourth toner cartridge position in the printer 320; installing the cyan toner printing cartridge into the first toner cartridge position in the printer where the black toner printing cartridge was originally installed (this may be the same removed cyan toner printing cartridge or a new one 325); and providing raster image processor (RIP) software for cartridge remapping and layered printing ability 330. Preferably, the combination of the non-standard toner printing cartridge being in the fourth position and the programming of the RIP software may allow the user to print a layer of non-standard toner over the other colors of the image in a single pass 335. The RIP software may: (1) allow the printer to recognize the non-standard toner printing cartridge and may specifically incorporate that toner into the image; (2) allow black to be printed using cyan, magenta, and yellow (the amount of each may be set or determined by RIP; usually 50-80% of each color is used to create a rich black); (3) remove colors from the image so they are not printed; (4) change one or more colors in the image so that another color prints in its place; (5) removing, reducing, or increasing the non-standard color over print; (6) rasterization; (7) cost calculations; (8) image layout customization 340. Preferably, the non-standard toner printing cartridges are selected from the group of non-standard toner printing cartridges consisting of: white; clear; clear fluorescent; metallic, ceramic, and security 345. Using the over print printing job as part of a heat transfer 355.

Figure 4:
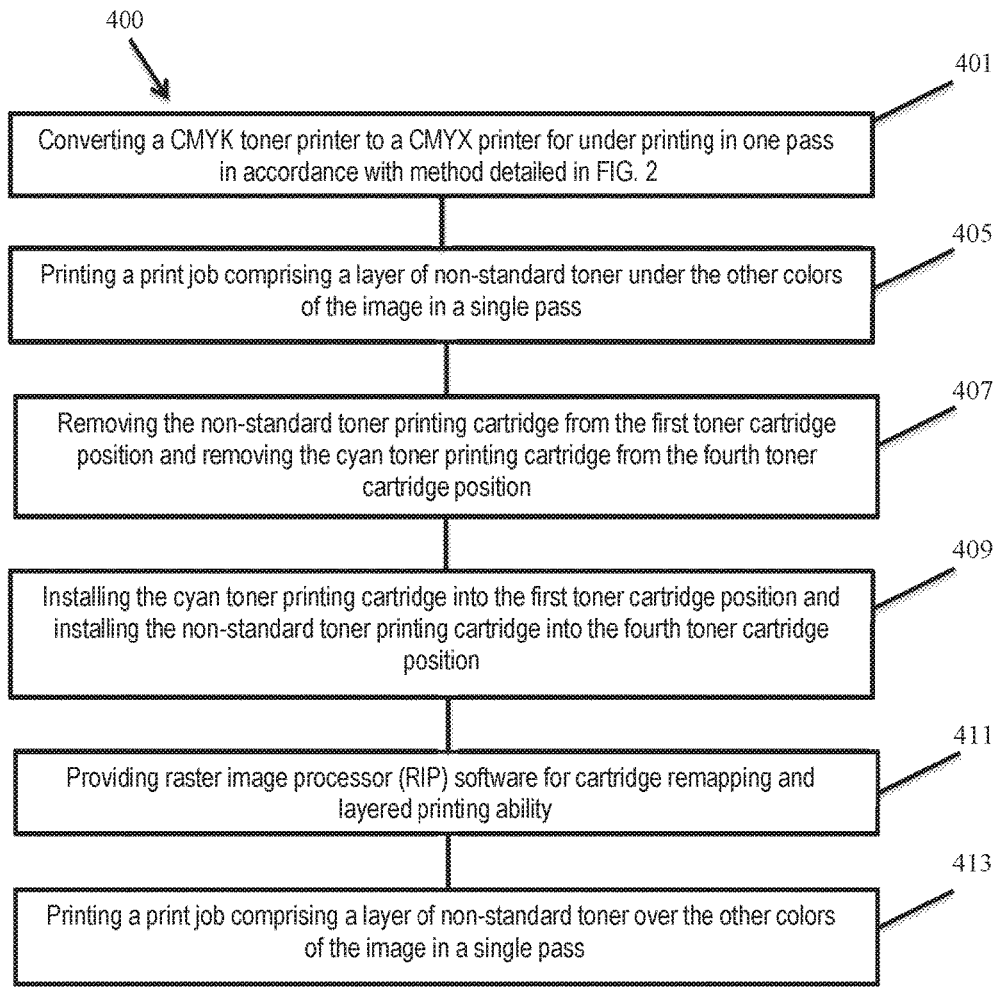
FIG. 4 is a flow block diagram of one embodiment of the method of converting a CMYX printer configured to under print to a CMYX printer configured to over print.

FIG. 4 is a flow block diagram of one embodiment of the method of converting a CMYX printer configured to under print to a CMYX printer configured to over print. The method 400 may begin with the first step of converting a CMYK toner printer to a CMYX printer for under printing in a single pass in accordance with method detailed in FIG. 2 401. To show that the printer is appropriately converted, the method 400 may comprise the step of printing a print job comprising a layer of non-standard toner beneath the other colors of the image in a single pass 405. The remainder of the steps may comprise: removing the non-standard toner printing cartridge from the first toner cartridge position and removing the cyan toner printing cartridge from the fourth toner cartridge position 407; installing the cyan toner printing cartridge into the first toner cartridge position and installing the non-standard toner printing cartridge into the fourth toner cartridge position 409; providing raster image processor (RIP) software for cartridge remapping and layered printing ability 411; and printing a print job comprising a layer of non-standard toner over the other colors of the image in a single pass 413.

Figure 5:
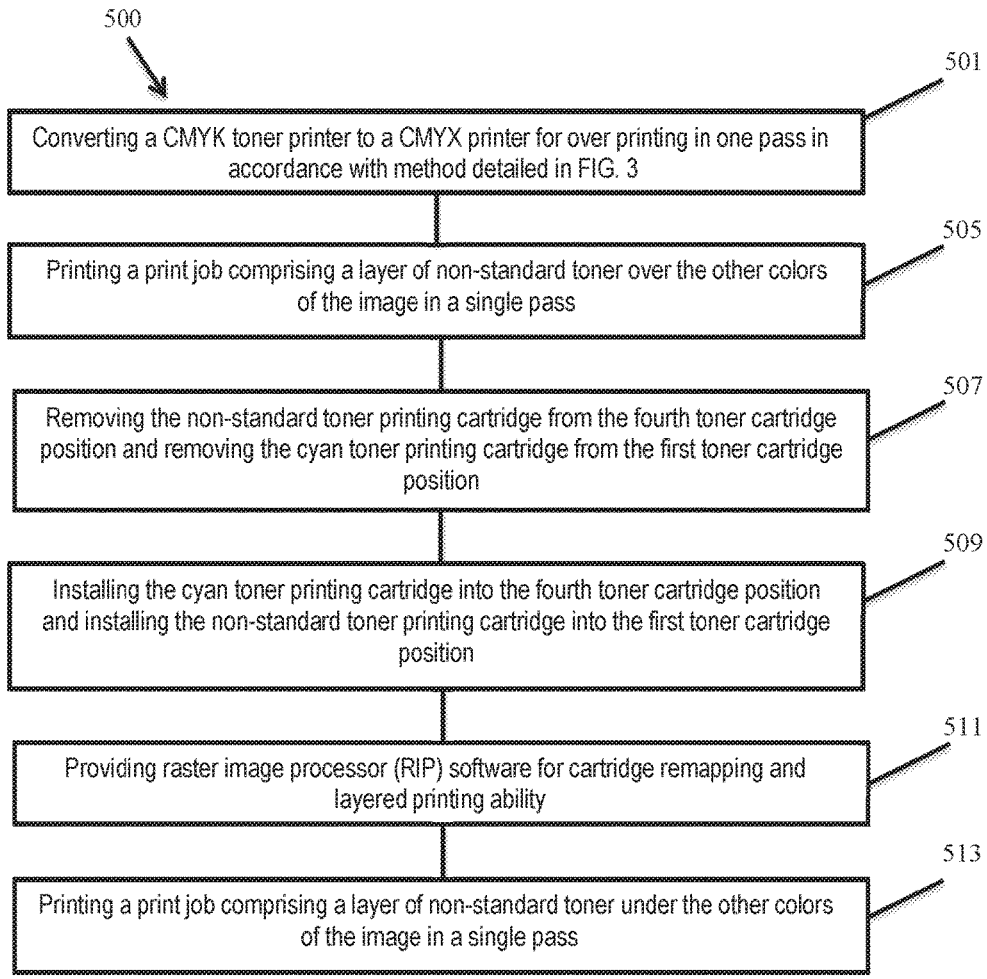
FIG. 5 is a flow block diagram of one embodiment of the method of converting a CMYX printer configured to over print to a CMYX printer configured to under print.

FIG. 5 is a flow block diagram of one embodiment of the method of converting a CMYX printer configured to over print to a CMYX printer configured to under print. The method 500 may comprise the steps of: converting a CMYK toner printer to a CMYX printer for over printing in a single pass in accordance with method detailed in FIG. 3 501; printing a print job comprising a layer of non-standard toner over the other colors of the image in a single pass 505; removing the non-standard toner printing cartridge from the fourth toner cartridge position and removing the cyan toner printing cartridge from the first toner cartridge position 507; installing the cyan toner printing cartridge into the fourth toner cartridge position and installing the non-standard toner printing cartridge into the first toner cartridge position 509; providing raster image processor (RIP) software for cartridge remapping and layered printing ability 511; and printing a print job, comprising a layer of non-standard toner beneath the other colors of the image in a single pass.

Figure 6:
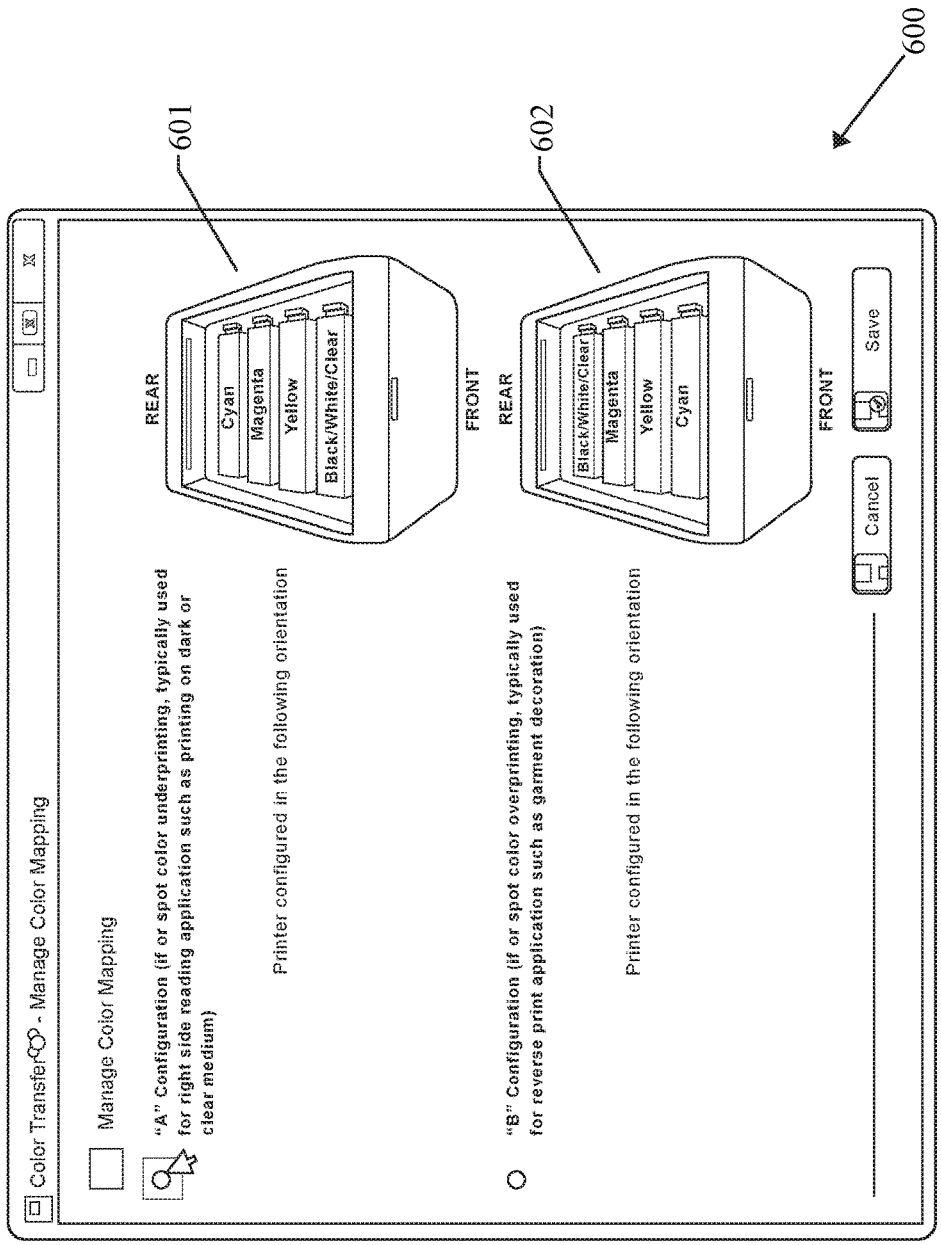
FIG. 6 is an illustration of a screen capture of the RIP software and shows the user selecting the user selecting between the over print printing and under print printing configurations.

FIG. 6 is an illustration of a screen capture of the RIP software and shows the user selecting between the over print printing and under print printing configurations. Preferably, the user first physically arranges the toner printing cartridges in the printer for the ability to over print or under print in a non-standard toner. As shown in FIG. 6, one embodiment of the screen RIP software may comprise a selection screen 600, which may allow the user to select the over or under print configurations. FIG. 6 shows that the non-standard toner may be white or clear, and if under print printing (or underprinting), the white toner may be in the first toner cartridge position 601. If over print printing (or overprinting), the white or clear toner may be in the fourth or last toner cartridge position 602. The RIP software may be configured to run on a computer that interfaces with the toner printer via wire or wireless connection. Once the user selects over printing 602 or under printing 601, the RIP software has effectively remapped the printer so that the printer recognizes that the user has installed a non-standard toner cartridge and the printer can print using this non-standard color.

The RIP software may allow printer to spot print with the non-standard color installed in either the first or fourth position. Selecting a white under print may be beneficial if the media being printed on is clear or if white would improve the contrast.

When the white or non-standard toner is in the first toner cartridge position the white toner prints first on the substrate, paper, or other media with which the printer engages and prints on. The RIP software controls the printer and allows the printer to first put down a layer of white, upon which the other colors may print on top of contemporaneously. In this manner the image to be printed is printed with an under layer of white all in only a single pass of the printer.

When the white or non-standard toner is in the fourth toner cartridge position, the white toner may print last on the substrate, paper, or other media with which the printer engages and prints on. The RIP software may allow the printer to first put down the color image and then contemporaneously put a layer of white on top of the color layer all in a single pass of the printer.

FIG. 6 also shows how the printer, after first under print printing, may then be reconfigured to over print with a non-standard toner. FIG. 6 also shows how the printer, after first over print printing, may then be reconfigured to under print with a non-standard toner. Prior to the present disclosure, no printer has ever been able to be configured to print using both methods.

Although the printer, as configured to print for over print or under print printing, does not have a black toner cartridge, the RIP software may allow black to be printed by using a combination of cyan, magenta, and yellow (the amount of each may be set or determined by RIP; usually 50-80% of each color is used to create a rich black). In this manner, the user preferably does not lose functionality of printing black. Indeed, the RIP software is programmed with standard color profiles of the International Color Consortium, which allows the printer to utilize the standard and non-standard toner printing cartridges to make any color required for the printing job.

Other features that of the RIP software may include: removing colors from the image so they are not printed; changing or one or more colors in the image so that another color prints in its place (swapping); removing, reducing, or increasing the non-standard color over/under print; rasterization; cost calculations; and image layout customization.

In some embodiments, the X non-standard toner may be in the first, fourth, or fifth toner printing cartridge slot and the black toner printing cartridge may be in the first, fourth, or fifth toner printing cartridge slot and whichever is not being used by the non-standard toner cartridge.

Another embodiment may be a CMYKX printer that underprints in a single pass, or overprints in a single pass, and/or does both and can be switched back and forth.

Overprint printers are useful in providing a clear or white background to an image that is heat transferred to a final surface from a transfer material. Underprint printers are useful in providing a clear or white background to an image that is printed on a non-standard or dark material/surface. The overprint of white may then be the background layer after the image is transferred/sublimated to the final media.

Figure 7:
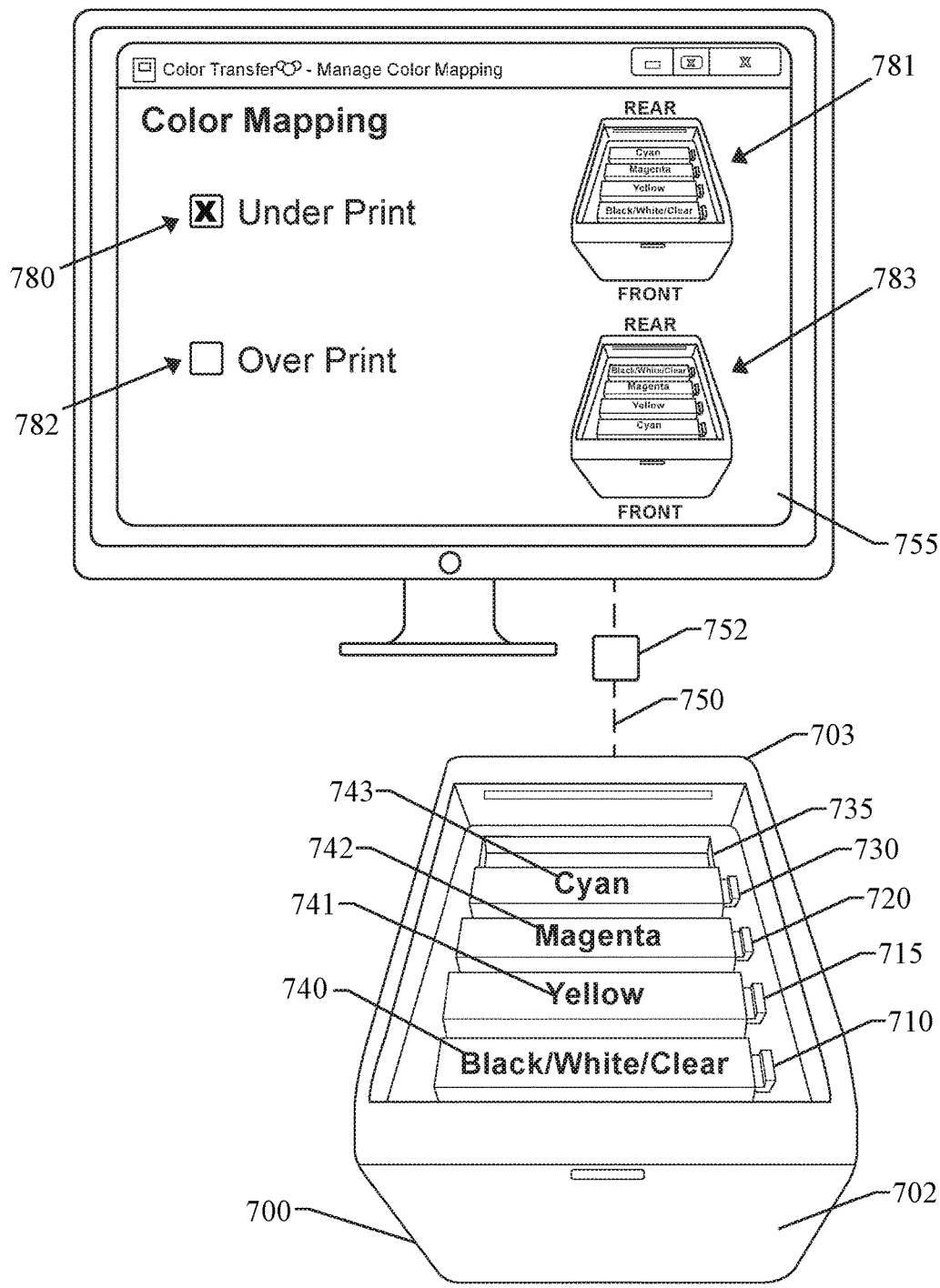
FIG. 7 is an illustration of a CMYX printer that can switch between over print printing and under print printing in an under-print configuration.

FIG. 7 is an illustration of a CMYX printer that can switch between over print printing and under print printing in an under-print configuration. FIG. 7 shows that CMYX printer 700 may also be a CMYKX printer, in that it may have four or five toner printer cartridges. The printer 700 may preferably be a toner color printer with cartridges and the cartridges may have individual drums or the printer may have a single drum. FIG. 7 shows that printer 700 may have front 702, rear 703, and four or five cartridge slots 710, 715, 720, 730, 735, in which cartridges 740, 741, 742, 743, 744, 745 may be placed. FIG. 7 shows that cartridges 740, 741, 742, and 743 have been inserted by the user into slots 710, 715, 720, and 730, respectively. As shown, cartridge 740 is an X cartridge (white or clear (preferably), cartridge 741 is a yellow cartridge, cartridge 742 is a magenta cartridge, cartridge 743 is a cyan cartridge. The colors may be other colors, the toners may be special toners (ceramic, sublimation, etc.) or regular toners. So long as the user updates the RIP software, the colors may be put in any order. Because an under print printing requires the "X" toner to go first, the "X" toner must be in the first slot 710. Once the user has physically positioned the cartridges in the slots, as desired, the user then sets the RIP (Raster Image Processing) software 752 to match the physical positions. The display 755 shows the graphical user interface of the software 752, which is connected by wire 750 or wirelessly, to the printer 700. The user may select under printer 780 or over print 782 and may set the toner order (from front to rear). FIG. 7 shows the user has selected under print 780 and has set the toners to be X-Y-M-C in graphical printer 781. The printer 700 may then print a print job, such as an under print printing job, in a single pass. Whether or not the print job is run, the printer 700 may be switched to be an over print printer, which means that printer 700 is a single printer that can both over print in a single pass, under print in a single pass, and then switch back and forth.

Figure 8:
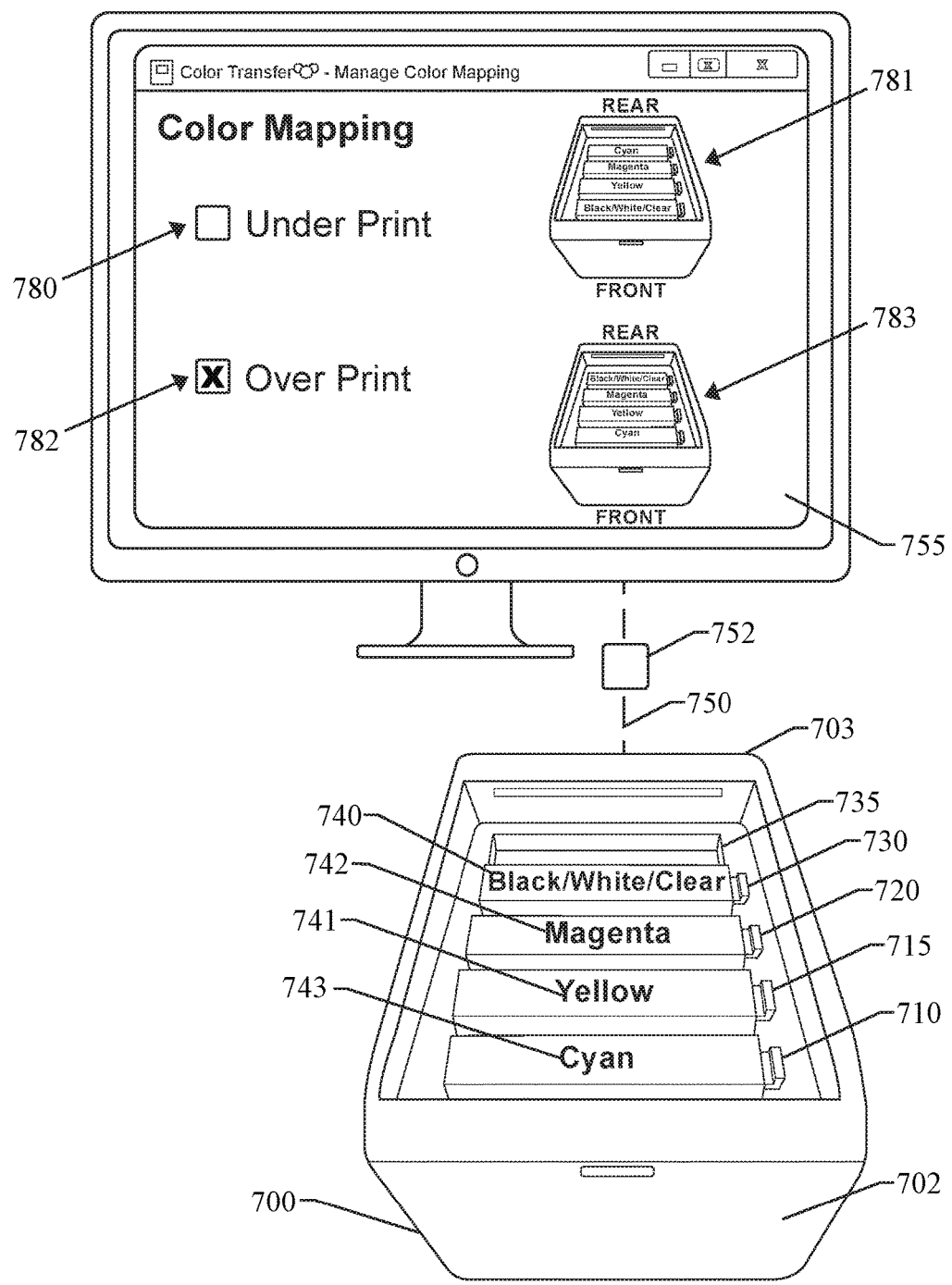
FIG. 8 is an illustration of a CMYX printer that can switch between over print printing and under print printing in an over-print configuration.

FIG. 8 is an illustration of a CMYX printer that can switch between over print printing and under print printing in an over-print configuration. In order to switch to an over print configuration, the user moves the white or clear x toner cartridge 740 to be in the last, rear, or fourth slot 730. The cyan cartridge 743 may be moved to the front or first slot 710. The user then updates the RIP software 752 by selecting over print 782 and setting the toners to be C-Y-M-X in graphical printer 783. The printer 700 may then print a print job, such as an over print printing job, in a single pass. Whether or not the print job is run, the printer 700 may be switched back to be an under print printer, which means that printer 700 is a single printer that can both over print in a single pass, under print in a single pass, and then switch back and forth. Because the color toners must be laid down first in an over print printing, and then covered by white or clear (all in a single pass), the white or clear toner X cartridge 740 must be last (and thus, in the last/rear slot 730). FIG. 7 shows how the user would switch the same printer back to being an under printer.

Figure 9:
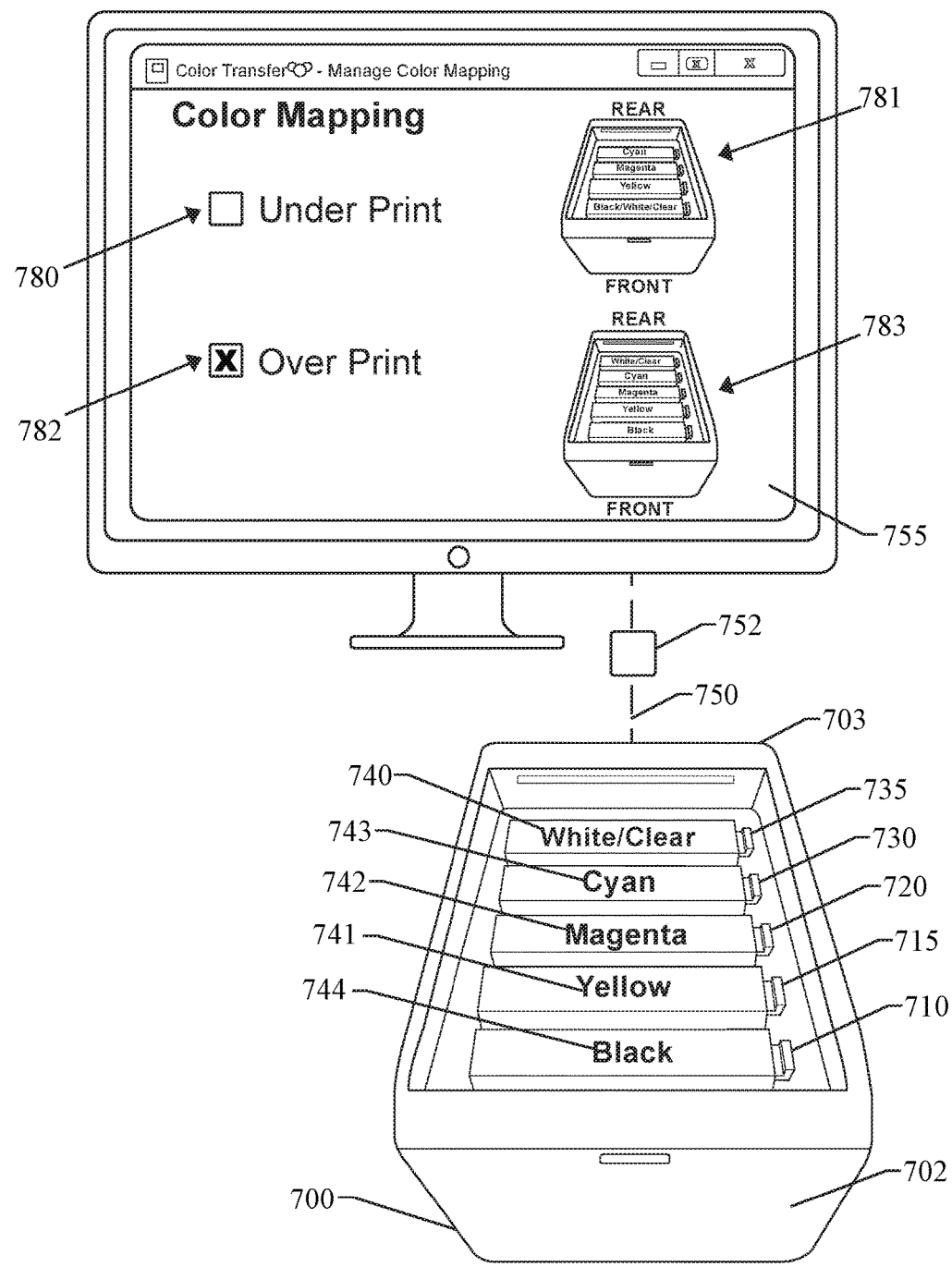
FIG. 9 is an illustration of a CMYKX printer that can switch between over print printing and under print printing in an over-print configuration.

FIG. 9 is an illustration of a CMYKX printer that can switch between over print printing and under print printing in an over-print configuration. In this embodiment the printer 700 has five slots 710, 715, 720, 730, 735, which may hold five cartridges 744, 741, 742, 743, 740, respectively, such that the cartridges are set as: K (usually black), Y (yellow), M (magenta), C (cyan), and X (clear or white). The user then updates the RIP software 752 by selecting over print 782 and setting the toners to be K-Y-M-C-X (front to back) in graphical printer 783. With five cartridges, the CMYKX printer 700 does not have to use a blend of each and every one of the CMY (color) toners to make black. The printer 700 may then print a print job, such as an over print printing job, in a single pass. Whether or not the print job is run, the printer 700 may be switched back to be an under print printer, which means that printer 700 is a single printer that can both over print in a single pass, under print in a single pass, and then switch back and forth. Because the color toners must be laid down first in an over print printing, and then covered by white or clear (all in a single pass), the white or clear toner x cartridge 740 must be last or in the rear, as shown in FIG. 9.

Figure 10:
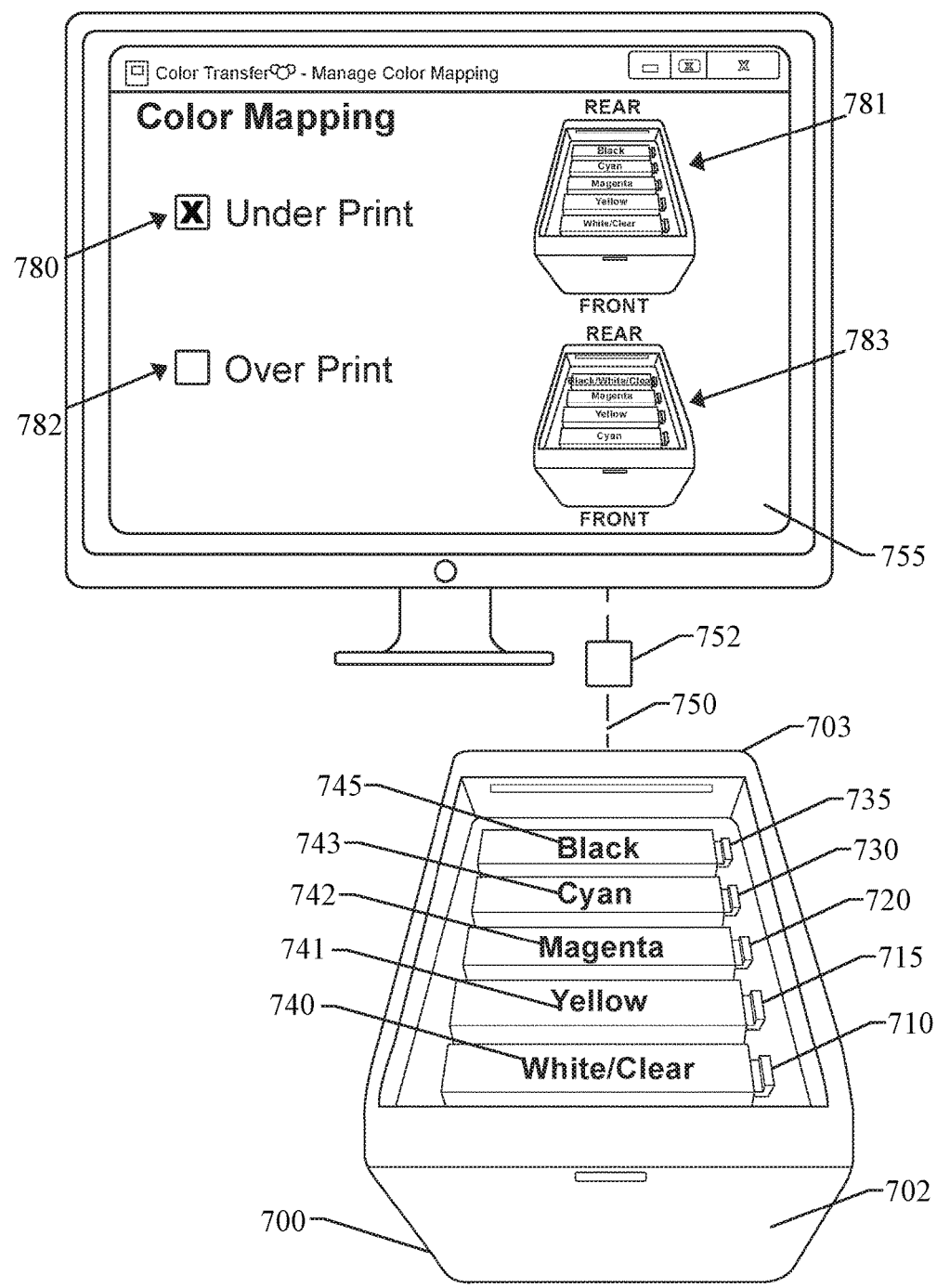
FIG. 10 is an illustration of a CMYKX printer that can switch between over print printing and under print printing in an under-print configuration.

FIG. 10 is an illustration of a CMYKX printer that can switch between over print printing and under print printing in an under-print configuration. In order to switch to an under print configuration, the user moves the white or clear X toner cartridge 740 to be in the first or front slot 710. The K (usually black) cartridge 745 may be moved to the last, rear, or fifth slot 735. The user may then update the RIP software 752 by selecting under print 780 and setting the toners to be X-Y-M-C-K in graphical printer icon 781. The printer 700 may then print a print job, such as an under print printing job, in a single pass. Whether or not the print job is run, the printer 700 may be switched back to be an over print printer, which means that printer 700 is a single five toner cartridge printer that can both over print in a single pass, under print in a single pass, and then switch back and forth. The white or clear X toner cartridge 740 must be in the front slot because the white or clear goes down first so it is under the rest of the colors and black toner that are laid down after and on top of the white or clear toner.

Unless otherwise stated, all measurements, values, ratings, positions, magnitudes, sizes, locations, and other specifications, which set forth in this specification, including in the claims that follow, are approximate, not exact. They are intended to have a reasonable range, which is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description, which shows and describes the illustrative embodiments. As will be realized, these embodiments are capable of modifications in various obvious aspects, all without departing from the spirit and scope of the present disclosure. Accordingly, the detailed description is to be regarded as illustrative in nature and not restrictive. Also, although not explicitly recited, one or more additional embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing which has been stated or illustrated is intended or should be interpreted to cause a dedication of any component, step, feature, object, benefit, advantage, or equivalent to the public, regardless of whether it is or is not recited in the claims.

What is claimed is:

1. A CMYX color toner printer system that is configured to both over print in a single pass and under print in a single pass and that is configured to switch between over and under printing, the system comprising:
    a color toner printer comprising four toner printing cartridge slots: a front slot, a second slot, a third slot, and a rear slot;
    four toner printing cartridges comprising three color toner printing cartridges and a non-standard toner printing cartridge that are configured to matingly engage with said four toner printing cartridge slots; and
    a raster image processor software;
    wherein said color toner printer is configured to over print when said non-standard toner printing cartridge is in said rear slot;
    wherein said color toner printer is configured to under print when said non-standard toner printing cartridge is in said front slot;
    wherein said raster image processor software is configured to (1) remap said color toner printer to reflect an actual placement of said four toner printing cartridges and (2) allows said color toner printer to under print in a single pass or over print in a single pass;
    wherein said color toner printer is configured to (1) over print in a single pass, (2) under print in a single pass, and (3) switch between being configured to over print and under print.

2. The system of claim 1, wherein said non-standard toner printing cartridge is selected from the group of non-standard toner printing cartridges consisting of: white; clear; and clear fluorescent.

3. The system of claim 1, wherein said raster image processor software is further configured to allow said color toner printer to spot print with said non-standard toner printing cartridge.

4. The system of claim 1, wherein said three color toner printer cartridges comprise: a cyan toner printing cartridge, a magenta toner printing cartridge, and a yellow toner printing cartridge.

5. The system of claim 4, wherein said raster image processor software is further configured to allow said color toner printer to print black by using, in combination, said cyan toner printing cartridge, said magenta toner printing cartridge, and said yellow toner printing cartridge.

6. The system of claim 1, wherein said non-standard toner printing cartridge comprises a chip that allows said color toner printer to recognize said non-standard toner printing cartridge.

7. The system of claim 1, wherein when said non-standard toner printing cartridge is in said rear slot, an image is printed beneath a layer of a non-standard toner in said non-standard toner printing cartridge in a single pass.

8. The system of claim 1, wherein when said non-standard toner printing cartridge is in said front slot, an image is printed above a layer of a non-standard toner in said non-standard toner printing cartridge in a single pass.

9. The system of claim 1, wherein when said non-standard toner printing cartridge is in said rear slot, an image is printed beneath a layer of a non-standard toner in said non-standard toner printing cartridge in a single pass.

10. The system of claim 1, wherein when said non-standard toner printing cartridge is in said front slot, an image is printed above a layer of a non-standard toner in said non-standard toner printing cartridge in a single pass.

11. A CMYKX color toner printer system that is configured to both over print in a single pass and under print in a single pass and that is configured to switch between over and under printing, the system comprising:
    a color toner printer comprising five toner printing cartridge slots: a front slot, a second slot, a third slot, a fourth slot and a rear slot,
    four toner printing cartridges comprising three color toner printing cartridges, a black toner printing cartridge, and a non-standard toner printing cartridge that are configured to matingly engage with said four toner printing cartridge slots; and
    a raster image processor software;
    wherein said color toner printer is configured to over print when said non-standard toner printing cartridge is in said rear slot;
    wherein said color toner printer is configured to under print when said non-standard toner printing cartridge is in said front slot;
    wherein said raster image processor software is configured to (1) remap said color toner printer to reflect an actual placement of said four toner printing cartridges and (2) allows said color toner printer to under print in a single pass or over print in a single pass;
    wherein said color toner printer is configured to (1) over print in a single pass, (2) under print in a single pass, and (3) switch between being configured to over print and under print.

12. The system of claim 11, wherein said non-standard toner printing cartridge is selected from the group of non-standard toner printing cartridges consisting of: white; clear; and clear fluorescent.

13. The system of claim 11, wherein said raster image processor software is further configured to allow said color toner printer to spot print with said non-standard toner printing cartridge.

14. The system of claim 11, wherein said three color toner printer cartridges comprise: a cyan toner printing cartridge, a magenta toner printing cartridge, and a yellow toner printing cartridge.

15. The system of claim 11, wherein said non-standard toner printing cartridge comprises a chip that allows said color toner printer to recognize said non-standard toner printing cartridge.

16. The system of claim 11, wherein when said non-standard toner printing cartridge is in said rear slot, an image is printed beneath a layer of a non-standard toner in said non-standard toner printing cartridge in a single pass.

17. The system of claim 11, wherein when said non-standard toner printing cartridge is in said front slot, an image is printed above a layer of a non-standard toner in said non-standard toner printing cartridge in a single pass.

18. A color toner printer system that is configured to both over print in a single pass and under print in a single pass and that is configured to switch between over and under printing, the system comprising:
   a color toner printer comprising at least four toner printing cartridge slots, a front slot, a second slot, a third slot, and a rear slot, which are configured to matingly engage with at least four toner printing cartridges comprising three color toner printing cartridges and a non-standard toner printing cartridge; and
   a raster image processor software;
   wherein said color toner printer is configured to over print when said non-standard toner printing cartridge is in said rear slot;
   wherein said color toner printer is configured to under print when said non-standard toner printing cartridge is in said front slot;
   wherein said raster image processor software is configured to (1) remap said color toner printer to reflect an actual placement of said at least four toner printing cartridges and (2) allows said color toner printer to under print in a single pass or over print in a single pass;
   wherein said color toner printer is configured to (1) over print in a single pass, (2) under print in a single pass, and (3) switch between being configured to over print and under print.

19. The system of claim 18, wherein said non-standard toner printing cartridge is selected from the group of non-standard toner printing cartridges consisting of: white; clear; and clear fluorescent.

20. The system of claim 18, wherein said raster image processor software is further configured to allow said color toner printer to spot print with said non-standard toner printing cartridge.

21. The system of claim 18, wherein said three color toner printer cartridges comprise: a cyan toner printing cartridge, a magenta toner printing cartridge, and a yellow toner printing cartridge.

22. The system of claim 21, wherein if said color printer only has four toner printing cartridge slots, said raster image processor software is further configured to allow said color toner printer to print black by using, in combination, said cyan toner printing cartridge, said magenta toner printing cartridge, and said yellow toner printing cartridge.

* * * * *